J. E. HOFFMAN.
COASTER VEHICLE.
APPLICATION FILED MAY 3, 1920.

1,373,004.

Patented Mar. 29, 1921.

INVENTOR.
John E. Hoffman.
BY
M. C. Gillham
ATTORNEY

UNITED STATES PATENT OFFICE.

JOHN E. HOFFMAN, OF KANSAS CITY, MISSOURI.

COASTER-VEHICLE.

1,373,004.

Specification of Letters Patent.   Patented Mar. 29, 1921.

Application filed May 3, 1920.   Serial No. 378,591.

*To all whom it may concern:*

Be it known that I, JOHN E. HOFFMAN, a citizen of the United States, residing at Kansas City, in the county of Jackson and State of Missouri, have invented a new and useful Coaster-Vehicle, of which the following is a specification.

My invention relates to coaster vehicles and especially to a device of this character which is used by children, and the object of the invention is to provide a cheap, durable, knockdown coaster vehicle and having facilities for absorbing shocks and vibrations to prevent injury to the child rider when coasting over uneven surfaces.

Figure 1:
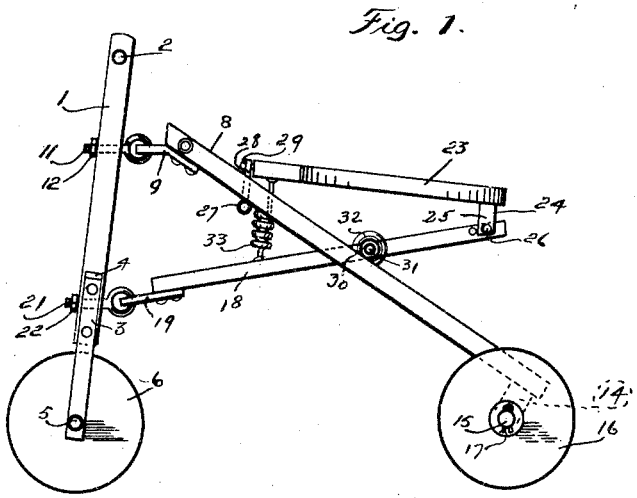
Figure 2:
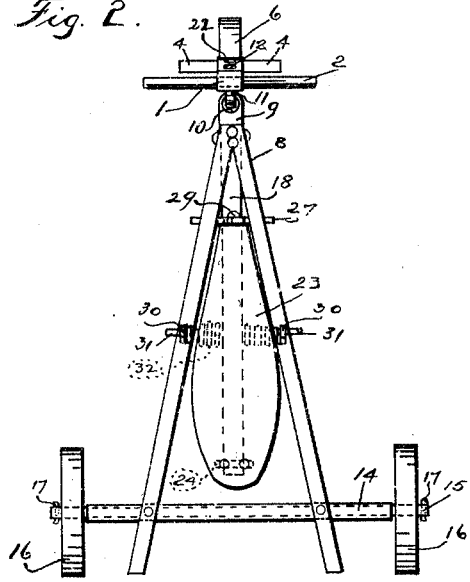
Figure 3:
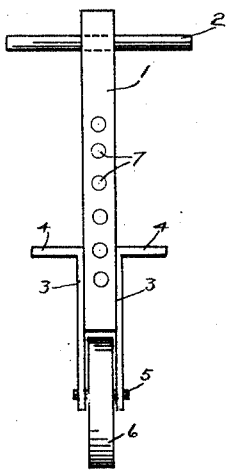

I attain these objects and other advantages by means of the mechanism and combination of parts illustrated in the accompany drawing in which—Figure 1, is a side elevation of a coaster vehicle constructed in accordance with my invention. Fig. 2, is a top view of the same and, Fig. 3, is a rear elevation of the steering post.

Similar numerals of reference refer to corresponding parts throughout the several views.

The numeral 1, designates a steering post and which is provided at its upper end portion with a handle bar 2. Metal straps 3, are attached longitudinally on the lower sides of the post, the upper end portions of which are bent outwardly at right angles to form foot rests 4, and a shaft 5, provided with a revoluble wheel 6, is mounted horizontally in the lower end portions of the straps. A series of bolt holes 7, are apertured transversely in the steering post, between the foot rests and the handle bar. An inclined inverted V-shaped frame 8, is provided at the point of the V with an angle iron 9, the free portion of which is provided with a hole 10, adapted for receiving the eye of an eye-bolt 11, which, in this instance, is entered into the uppermost bolt hole 7, where it is secured in place by the nut 12. The lower end portions of the limbs of the V-shaped frame are recessed on their lower sides and the recesses adapted for receiving a bolster 14, on the lower side of which is mounted an axle 15, having revoluble wheels on its terminal ends, which wheels are held in place thereon by cotter pins 17, which are extended through the shaft outwardly of the wheels. A seat supporting member 18, having an angle iron 19, secured on its lower end portion, the free end of the angle iron having a hole adapted for receiving the eye of an eye-bolt 21, is extended, in this instance, through the lowermost bolt hole in the steering post, where it is held in place by nut 22, the member 18, being extended slantingly upward between the limbs of the V-shaped frame. A seat 23, is provided on its lower side, adjacent the rear end thereof, with a bridging member 24, having down turned flanges 25, which are attached movably on the seat supporting member, by pins 26, which function as pivots to allow the seat to rotate rearwardly and lie upon the supporting member and form therewith a compact bundle when transported in knock down condition. An anchor 27, is attached on the forward end of the seat 23, the former having legs 28, the terminal portions of which are bent outwardly to form toes, the latter being arranged to engage the lower sides of the limbs of the frame 18, to prevent unshipping of the seat by accidental means. A screw 29, is arranged to enter the end of the seat and hold the anchor in place. Screw eyes 30 are mounted on the upper sides of the limbs of the frame, at opposite sides of the seat and studs 31, which are mounted in the sides of the seat supporting member are entered into the screw eyes. Compression springs 32, are mounted on the studs 31, and are arranged to press on the screw eyes 30, and on the sides of the seat supporting member and thereby shocks and vibrations calculated to impart lateral movement to the seat 23, are absorbed. A retractible spring 33, is connected between the seat supporting member 18, and the forward portion of the seat 23, for the purpose of absorbing shock and vibration in vertical direction to prevent jolting of the seat, which otherwise might startle a child and cause his control of the coaster to be lost.

If it is desired to transport the vehicle in knock down condition the parts are readily detached and then folded or arranged in a compact and convenient package or bundle. The parts are likewise readily assembled to form a vehicle.

Having described my invention what I claim is—

In a coaster vehicle, the combination of an inclined inverted frame, an axle attached crosswise of the outer portion of the limbs of said frame and provided with revoluble wheels, a seat supporting member extending between the limbs of said frame and movably supported thereby, a seat rotatably mounted on the upper end of said seat supporting member, an anchor attached on the front end of said seat and adapted for engaging the lower sides of the limbs of said frame, compression springs disposed between said seat supporting member and the limbs of said frame, a retractile spring connected between said seat supporting member and said seat, and a steering post swiveling on the forward ends of said frame and said seat supporting member and having at its lower end a revoluble wheel.

Kansas City, Jackson county, Missouri, May 1st, 1920.

JOHN E. HOFFMAN.

Witnesses:
    JOHN C. STEARNS,
    H. D. ELLINWOOD.